No. 851,019. PATENTED APR. 23, 1907.
J. M. MODEL.
CAGE RING FOR BALL BEARINGS.
APPLICATION FILED JULY 17, 1906.

WITNESSES
W. P. Burke
J. H. Saunders

INVENTOR
Johann Michael Model
BY Richardson
ATT'YS

UNITED STATES PATENT OFFICE.

JOHANN MICHAEL MODEL, OF SCHWEINFURT, GERMANY.

CAGE-RING FOR BALL-BEARINGS.

No. 851,019. Specification of Letters Patent. Patented April 23, 1907.

Application filed July 17, 1906. Serial No. 326,631.

*To all whom it may concern:*

Be it known that I, JOHANN MICHAEL MODEL, merchant, a subject of the King of Bavaria, residing at No. 11 Seestrasse, Schweinfurt-on-the-Main, (German Empire,) have invented new and useful Improvements in Cage-Rings for Ball-Bearings, of which the following is a specification.

The subject of my invention is a cage-ring for ball-bearings by means of which the spheres are kept at equidistances apart in their race, whereby all direct friction of the balls against each other during running is prevented, while by means of fillers of felt or the like the lubricant is held and distributed. Furthermore, all useless play and concussion of the balls when running are obviated and perfectly silent working insured. In addition to these main features the new cage has the advantage of being considerably easier and cheaper to manufacture than prior types of cages. It may consist merely of a metal band, which may be formed, for instance, by bending a strip of steel, there being thus no waste of material through stamping or the like. The balls being embraced by the undulating band, all possibility of their being fractured by collisions owing to shocks is obviated and damage to the bearing thus effectively prevented, nor can the race be injured through the balls merely sliding along, owing to one ball acting as a brake on the other.

The serpentine form of the cage and the presence of the felt or like fillers also prevent the cage itself from getting injured, and in this manner also flying out of the balls at high speeds, such as sometimes occurs when separate spring spacing devices are used, is rendered impossible. The soft fillers likewise prevent the access of foreign particles to the race and insure regular distribution of lubricant.

My invention is illustrated in the accompanying drawings, in which—

Figure 1:
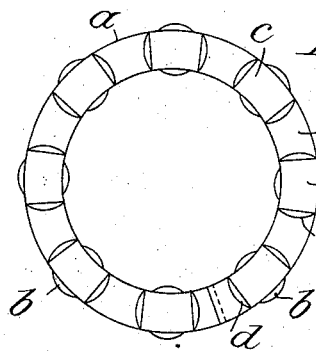
Figure 2:
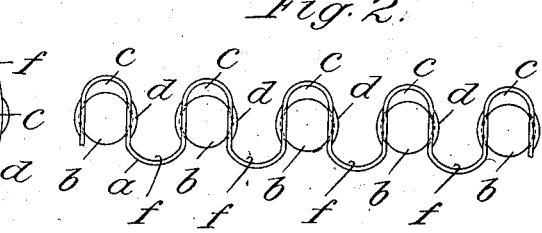
Figure 3:
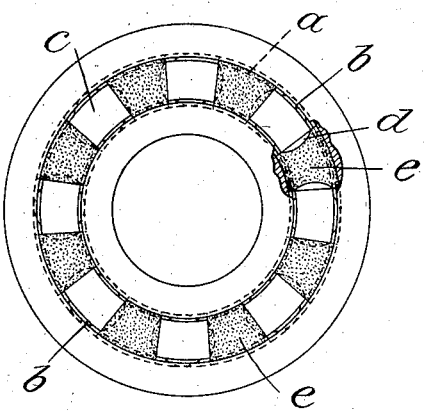
Figure 4:
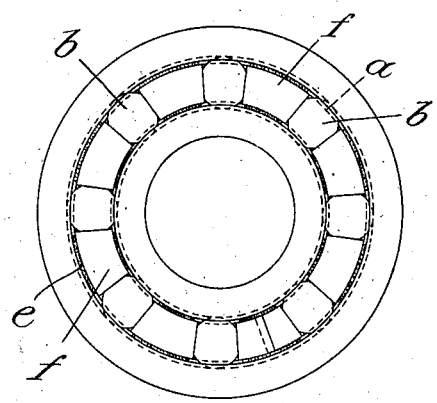
Figure 5:
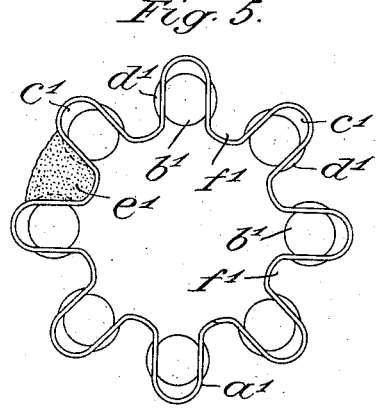
Figure 6:
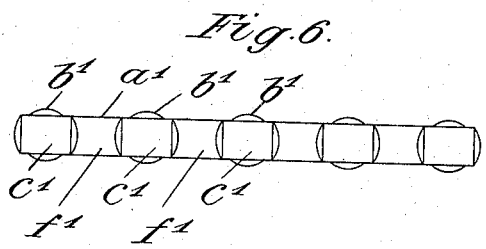

Figure 1 is an elevation of a cage-ring with balls. Fig. 2 shows a side view of a portion of the cage-ring with balls as it would appear when straightened out. Fig. 3 is an elevation and part section of a ball-race fitted with the cage-ring shown in Figs. 1 and 2. Fig. 4 shows the other side of Fig. 3. Fig. 5 is a plan of a cage-ring with balls for a step or supporting bearing. Fig. 6 shows a side view of a portion of this cage-ring with balls straightened out.

The cage-ring, as the drawing shows, consists of a strip of steel or other material $a$, which is given a sinuous shape, so that a ball $b$ can be pressed into each undulation or bend $c$. These undulations at those parts with which the balls contact in the direction of running are provided with recesses or indentations $d$, in which the balls hang after insertion in the cage, as shown in Figs. 1 and 2. In the bends $f$ between each two balls there are inserted, as shown in Fig. 3, fillers $e$, of felt or other soft material, which takes up the lubricant. These fillers receive a firm hold from the salient back walls of the recesses $d$.

The cage-ring shown in Figs. 5 and 6 is designed to step or supporting bearings and differs from that just described only in so far that the undulations $c'$ of the strip $a'$, which receive the balls $b'$, lie radially instead of parallel to the center axis of the ball-race, as in the construction illustrated in Figs. 1 to 4. The walls of the undulations are provided, as before, with recesses $d'$ at the parts with which the balls contact, whereby the balls are firmly held. The back of the recesses at the same time constitute swells between which the lubricating-fillers $e'$ are inserted.

Having thus described my invention, what I claim as new, and desire to secure by Letters Patent, is—

1. A cage-ring, comprising a sinuous metallic strip, the walls of the undulations of which are indented so as to form on one side of the strip recesses to receive the balls and on the other side swells; and fillers of soft material inserted in the undulations between the swells; substantially as described.

2. A ball-bearing, comprising in combination two concentric collars grooved to present a race; a sinuous cage-ring located in the race and having substantially parallel portions, the alternate undulations of which ring have indented walls; balls located in these undulations; and soft fillers located in the other undulations; substantially as described.

In witness whereof I have hereunto signed my name, this 30th day of June, 1906, in the presence of two subscribing witnesses.

JOHANN MICHAEL MODEL.

Witnesses:
C. P. DE SAONE,
M. PRIER DE SAONE.